Aug. 16, 1966 J. S. BARRETT 3,266,606

MAGNETIC FLUID CLUTCH WITH LAMINATED STRUCTURE

Original Filed May 21, 1962

INVENTOR.
JOHN S. BARRETT
BY
Roy Eilers
ATTORNEY.

United States Patent Office 3,266,606 Patented August 16, 1966

3,266,606

MAGNETIC FLUID CLUTCH WITH LAMINATED STRUCTURE

John S. Barrett, Chagrin Falls, Ohio, assignor to Sperry Rand Corporation, New York, N.Y., a corporation of Delaware Continuation of application Ser. No. 196,347, May 21, 1962. This application Sept. 24, 1964, Ser. No. 404,544
404,544
5 Claims. (Cl. 192—21.5)

Figure 1:
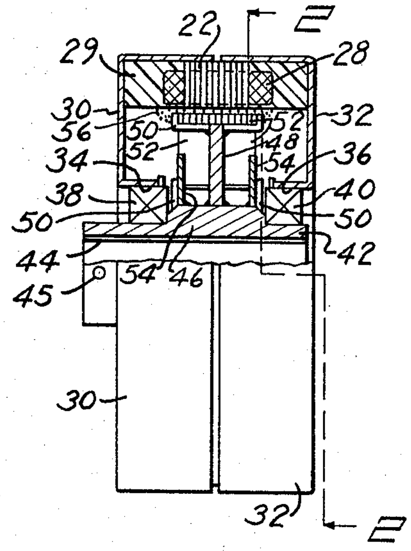

This application is a continuation of my co-pending application Serial No. 196,347 for Control Systems which was filed May 21, 1962, and now abandoned.

This invention relates to improvements in control systems. More particularly, this invention relates to improvements in magnetic circuits for electromagnetic devices.

It is, therefore, an object of the present invention to provide an improved magnetic circuit for an electromagnet device.

In the operation of an electromagnetic device, such as an electromagnetic clutch or electromagnetic brake which uses magnetic particles, a voltage is selectively applied to the coil of that device to selectively force current to flow through that coil. That current will cause that coil to generate a magnetic field which will enable the magnetic particles to apply forces to the relatively-rotatable parts of that device; and those forces will enable that device to perform its intended function. The magnetic particles will substantially fill the working gap between the relatively-rotatable parts of that device, and will thus reduce the reluctance of that gap. Consequently, while that working gap will constitute a necessary and unavoidable reluctance in the magnetic circuit of the electromagnetic device, the reluctance of that gap will be small.

The magnetic circuits of many electromagnetic devices, such as electromagnetic clutches or electromagnetic brakes which use magnetic particles, have gaps in addition to the working gaps thereof, and those additional gaps are objectionable because they increase the amounts of power that are needed to operate those electromagnetic devices. It would be desirable to eliminate all additional gaps from the magnetic circuit of an electromagnetic device, such as an electromagnetic clutch or electromagnetic brake which uses magnetic particles, because the elimination of all such additional gaps would decrease the amount of power needed to operate that electromagnetic device. Such a decrease in power would make the operation of that electromagnetic device more economic, and would also decrease the heating of that electromagnetic device. The present invention makes it possible to eliminate all additional gaps from the magnetic circuit of an electromagnetic device, such as an electromagnetic clutch or electromagnetic brake which uses magnetic particles; and thereby makes it possible to reduce the amount of power needed to operate that electromagnetic device. It is, therefore, an object of the present invention to eliminate all additional gaps from the magnetic circut of an electromagnetic device, such as an electromagnetic clutch or electromagnetic brake using magnetic particles.

The pole pieces of electromagnetic devices, such as electromagnetic clutches or electromagnetic brakes which use magnetic particles, are customarily made as solid pieces of magnetic material. The use of such solid pieces of magnetic material causes those electromagnetic devices to have long time constants. As a result, it is not uncommon for electromagnetic devices, such as electromagnetic clutches or electromagnetic brakes which use magnetic particles and which have pole pieces of solid magnetic material, to have time constants of several hundred milliseconds. In many instances, a time constant of several hundred milliseconds is objectionably long; and hence it would be desirable to provide an electromagnetic device, such as an electromagnetic clutch or electromagnetic brake which uses magnetic particles, that has a short time constant. The present invention provides an electromagnetic device, such as an electromagnetic clutch or electromagnetic brake which uses magnetic particles, that has a short time constant; and it does so by forming the pole pieces of that electromagnetic device from laminations of magnetic material. It is, therefore, an object of the present invention to form the pole pieces of an electromagnetic device, such as an electromagnetic clutch or electromagnetic brake which uses magnetic particles, from laminations of magnetic material.

An electromagnetic device, such as an electromagnetic clutch or electromagnetic brake which uses magnetic particles, customarily has a winding mounted on one of the relatively-rotatable parts thereof; and that winding customarily provides only a small number of magnetic poles. As a result, the other relatively-rotatable part of that electromagnetic device must have a large mass to enable it to have a low reluctance. A large mass for that other relatively-rotatable part means that the said part will have a large moment of inertia; and such a moment of inertia can means a long response time for that electromagnetic device. One embodiment of the present invention makes it possible to reduce the mass of the other relatively-rotatable part of an electromagnetic device, such as an electromagnetic clutch or electromagnetic brake which uses magnetic particles, and thus makes it possible to reduce the moment of inertia of that part by providing a multiplicity of poles for the one relatively-rotatable part of that electromagnetic device. The multiplicity of poles for that one part makes it possible to reduce the number of flux lines per pole and still have the same total overall flux density. With a reduced number of flux lines per pole, the mass of the other relatively-rotatable part of the electromagnetic device can be reduced, with a resulting overall shortening of the response time of that electromagnetic device. It is, therefore, an object of the present invention to provide an electromagnetic device, such as an electromagnetic clutch or electromagnetic brake using magnetic particles, with a multiplicity of poles.

The poles of the said one embodiment of electromagnetic device provided by the present invention alternate in polarity; and this is desirable because it reduces the overall lengths of the flux paths in the other relatively-rotatable part of that electromagnetic device. The resulting short flux paths enable that other relatively-rotatable part to having a low reluctance even though the said paths have small cross sections. The overall result is that the mass and the moment of inertia of the other relatively-rotatable part of an electromagnetic device can be reduced—with consequent shortening of the response time of that electromagnetic device. It is, therefore, an object of the present invention to provide an electromagnetic device, such as an electromagnetic clutch or electromagnetic brake which uses magnetic particles, with poles of alternating polarity.

The rotors of the electromagnetic devices provided by the present invention have annuli of magnetic material and have narrow webs that support those annuli. Those annuli confront, and are closely adjacent, the stators of those electromagnetic devices; and those annuli are substantially co-extensive with those stators. The masses of the annuli are made as small as practicable and the masses of the webs also are made small. In this way, the response times of the electromagnetic devices provided by the present invention are additionally shortened.

Other and further objects and advantages of the present invention should become apparent from an examination of the drawing and accompanying description.

In the drawing and accompanying description, two preferred embodiments of the present invention are shown and described but it is to be understood that the drawing and accompanying description are for the purpose of illustration only and do not limit the invention and that the invention will be defined by the appended claims.

Figure 2:
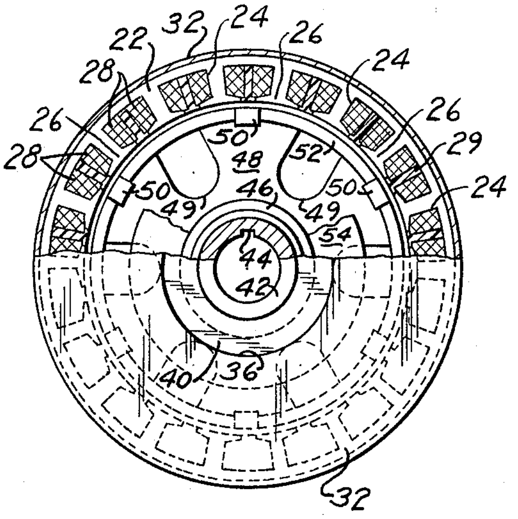
Figures 3, 4:
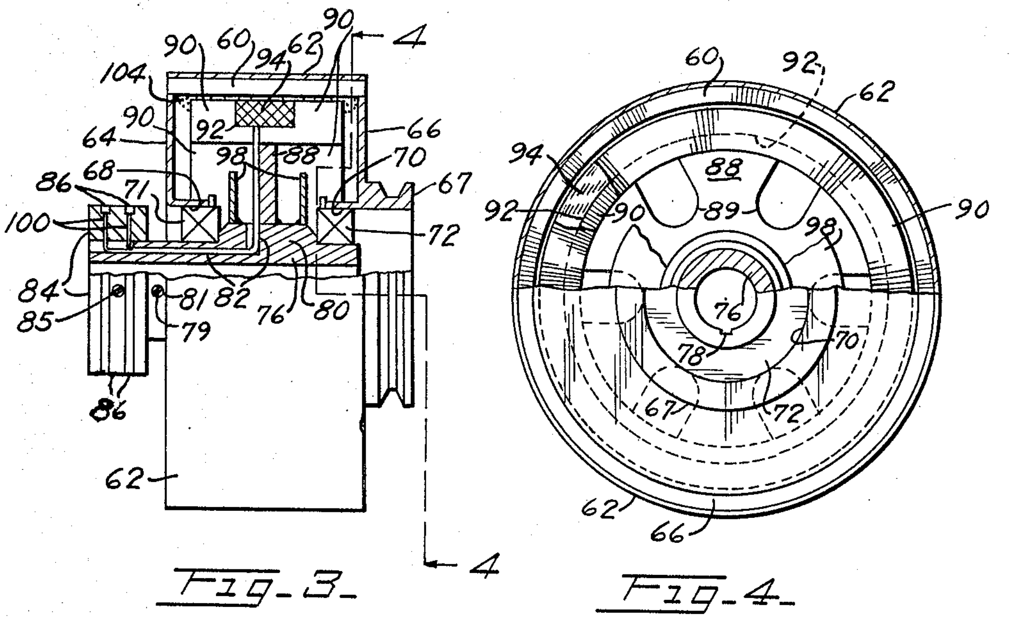

In the drawing, FIG. 1 is a partially-broken, and elevational view of one embodiment of electromagnetic device that is made in accordance with the principles and teaching of the present invention, FIG. 2 is a partially-sectioned, side elevational view of the electromagnetic device of FIG. 1, and it is taken along the broken plane indicated by the broken line 2—2 in FIG. 1, FIG. 3 is a partially-broken, and elevational view of a second embodiment of electromagnetic device that is made in accordance with the principles and teachings of the present invention, and FIG. 4 is a partially-sectioned, side elevational view of the electromagnetic device of FIG. 3, and it is taken along the broken plane indicated by the broken line 4—4 in FIG. 3.

Referring to the drawing in detail, the numeral 22 denotes the stator of one embodiment of electromagnetic device that is made in accordance with the principles and teachings of the present invention. That stator consists of a number of thin annular laminations of magnetic material, as for example steel. Those laminations will be suitably insulated from each other by layers of oxide thereon or by layers of insulating paint or the like between them. Those laminations can be suitably held in assembled relation by rivets or bolts or other means, not shown.

The stator 22 has a number of circumferentially-spaced slots 24 therein, and those slots define teeth 26. Also, those slots accommodate the turns of a winding 28. The inner ends of the teeth 26 are elongated, in the circumferential direction, and those inner ends partially close the slots 24. The winding 28 has turns thereof disposed within each of the slots 24; and that winding is formed so adjacent poles are of opposite polarity. The winding 28 can be made as one continuous winding or can be made as a number of separate windings—the principal requirements of the winding 28 being that it make the adjacent poles of opposite polarity and that it provide the required total number of flux lines.

After the winding 28 has been disposed within the slots 24, a "potting" compound 29 will be used to fill the remaining spaces in those slots. That "potting" compound also will extend outwardly beyond the faces of the left-handmost and the right-handmost laminations of the stator 22, and will enclose and embed the end turns of the winding 28. Further, that "potting" compound will provide a wear-resistant annulus which will help define the open area in the interior of the housing for the electromagnetic device. Different "potting" compounds could be used, but the epoxy resins are preferred. The "potting" compound will be formed in a suitable mold.

The housing for the electromagnetic device of the present invention includes cup-like members 30 and 32 of magnetic or non-magnetic material. The inner peripheries of those members are approximately equal to the outer diameter of the stator 22; and those cup-like members can be pressed onto that stator. The "potting" compound 29 will be formed so the end faces and the periphery thereof, will closely abut the inner faces of the cup-like members 30 and 32.

The cup-like member 30 has an annular socket 34, and the cup-like member 32 has an annular socket 36. Those sockets are in register with each other, and they accommodate the outer races of anti-friction bearings 38 and 40, respectively. The inner races of those anti-friction bearings accommodate reduced-diameter portions of a hollow shaft 42. That hollow shaft has a keyway 44 which will enable it to be locked against rotation relative to a shaft which is telescoped into it. The hollow shaft 42 also has a threaded opening 45 which can accommodate a set screw, and that set screw can bear against the shaft which will be telescoped through that hollow shaft.

The hollow shaft 42 has a centrally-located portion 46 of greater thickness, and that portion provides shoulders against which the inner races of the anti-friction bearings 38 and 40 can be pressed. A web 48 is suitably secured to the portion 46 of increased thickness, as by brazing or welding; and that web has openings 49 therein, as shown particularly by FIG. 2. Axially-extending clamps 50 are suitably secured to the web 48, as by brazing or welding, and those clamps project outwardly from each face of that web. The ends of those clamps extend radially outwardly toward the winding 28; and those clamps hold an annulus 52 of magnetic material. That annulus consists of a number of thin annular laminations of magnetic material, such as steel; and those laminations will be suitably insulated from each other by layers of oxide thereon or by layers of insulating paint or the like between them. The clamps 50 hold the laminations of the magnetic annulus 52 in intimate engagement with each other and hold them substantially in register with the laminations of the stator 22.

Slingers 54 are mounted on the portion 46 of increased thickness of the hollow shaft 42; and those slingers are mounted inwardly of the anti-friction bearings 38 and 40. Magnetic particles 56 are disposed within the housing of the electromagnetic device of FIGS. 1 and 2; and most of those magnetic particles will be disposed within and adjacent to the working gap between the stator 22 and the magnetic annulus 52. To facilitate a clear showing of the relatively-rotatable parts in FIG. 2, the magnetic particles 56 are not shown in FIG. 2. Those magnetic particles are of standard and usual size, form and composition; and enough of those magnetic particles are provided to more than fill the working gap between the stator 22 and the annulus 52 of magnetic material. The slingers 54 are intended to cause any magnetic particles 56, that tend to work their way into the anti-friction bearings 38 and 40, to be thrown radially outwardly toward the working gap. The magnetic lines of force generated by the winding 28 will then be able to attract those magnetic particles and to keep them from passing into the anti-friction bearings 38 and 40.

The radially-directed dimensions of the laminations of the annulus 52 of magnetic material are preferably equal to one-half of the widths of the narrowest portions of the laminations of the stator 22. Such an arrangement is important in reducing the mass and moment of inertia of the rotor, which includes the hollow shaft 42, the slingers 54, the web 48, and the annulus 52 of magnetic material. The radially-directed dimensions of the laminations of the annulus 52 of magnetic material can be made that small because each pole of the stator 22 is of alternate polarity; and the alternations of the polarities of those poles cause the flux lines passing radially inwardly through any given pole to divide the flow in opposite directions through the annulus 52 of magnetic material, thereby making the number of flux lines flowing through each section of that annulus about one-half of the number of flux line flowing through that pole.

The multiplicity of poles 26 that is provided for the stator 22 is important, because it very materially reduces the lengths of the flux paths through the annulus 52 of magnetic material. For example, magnetic flux lines passing radially inwardly through a given pole will pass through the magnetic particles 56 in the working gap between the stator 22 and the annulus 52; and then half of those flux lines will move through that annulus in the clockwise direction until they are in register with the next clockwise pole while the rest of those flux lines will move in the counter clockwise direction through that annulus until they are in register with the next counter clockwise pole, and thereafater those flux lines will move radially outwardly through the working gap and into those poles. The overall result is that the magnetic flux lines have very short paths through the annulus 52 of magnetic material. The shortness of those paths makes it possible to reduce the cross section, and thus the mass, of the annulus 52 of the electromagnetic device shown in FIGS. 1 and 2.

The web 48 is thin and thus has a small mass; and that small mass is additionally reduced by the presence of the openings 49. The overall result is that the mass and moment of inertia of the rotor of the electromagnetic device of FIGS. 1 and 2 are small.

The electromagnetic device of FIGS. 1 and 2 is adapted for use as an electromagnetic brake; and where that electromagnetic device is to be used as an electromagnetic brake, the hollow shaft 42 will be telescoped over and secured to a rotatable shaft, not shown, and the housing will be suitably held stationary. As long as the winding 28 remains de-energized, the hollow shaft 42 will be able to rotate freely relative to the housing of the electromagnetic device; and hence the shaft, not shown, will be able to rotate freely relative to that housing. However, when current is caused to flow through the winding 28, magnetic fluix lines will flow through each odd-numbered pole, across the working gap into the annulus 52, through portions of that annulus, and then back across that working gap into the even-numbered poles. Those magnetic flux lines will hold most of the magnetic particles 56 within that working gap; and those magnetic particles will apply forces to the stator 22 and to the annulus 52 which will cause the hollow shaft 42 to tend to come to rest. The amount of current flowing through the winding 28 will determine the amount of breaking force which the magnetic particles 56 can apply to the hollow shaft 42. Preferably, the winding 28 will be made so sufficient current can flow through it to enable the magnetic flux lines to coact with the particles 56 of magnetic material to prevent relative rotation between the hollow shaft 42 and the housing.

The electromagnetic device of FIGS. 1 and 2 can be modified so it will be adapted for use as an electromagnetic clutch. Specifically, that device can be made so the winding thereof will be mounted on the rotor, so the housing thereof is rotatable, and so that housing includes an annulus, of magnetic material, that has a small cross section. That rotor will have a multiplicity of slots therein, and the winding will be disposed within those slots to generate a multiplicity of magnetic poles. The odd-numbered poles will be of one polarity, and the even-numbered poles will be of opposite polarity. Suitable slip rings and brushes will be provided to conduct current to that winding. The housing and its annulus of magnetic material will have a small mass. That housing will be suitably secured to a driven member, not shown, and the hollow shaft 42 will be telescoped over and secured to a driving shaft, not shown. As long as the winding remains de-energized the driving shaft, not shown, will be able to rotate freely relative to the driven member, not shown. However, when current is caused to flow through that winding, magnetic flux lines will flow through each old-numbered pole, across the working gap into the annulus of the housing, through portions of that annulus, and then back across that working gap into the even-numbered poles. Those magnetic flux lines will hold most of the magnetic particles within that working gap; and those magnetic particles will apply forces to the rotor and to the annulus which will force the housing to rotate with the hollow shaft 42—and thus force the driven member to rotate with the driving shaft.

The only gap for the magnetic flux lines in the electromagnetic device of FIGS. 1 and 2, and in the modified form of that electromagnetic device, is the working gap between the confronting faces of the relatively-rotatable parts. As a result, the electromagnetic device of FIGS. 1 and 2, and the modified form of that electromagnetic device, are completely free of the additional gaps in the direction of flow of flux lines commonly found in electromagnetic devices which use magnetic particles.

The laminating of the stator 22 and of the annulus 52, the provision of a multiplicity of poles for that stator, the alternation of the polarities of those poles, the use of an annulus of narrow cross section, and the use of a thin web to support that annulus make it possible to provide a time constant for the electromagnetic device of FIGS. 1 and 2 which is much shorter than the time constant of a conventional electromagnetic device using magnetic particles. Specifically, a conventional electromagnetic device with a torque rating of twenty pound-feet has an overall time constant of about three hundred milliseconds; but the electromagnetic device of FIGS. 1 and 2 can be made to produce the same torque rating and yet have an overall time constant of less than fifteen milliseconds. In fact, the electromagnetic device of FIGS. 1 and 2 can have an overall time constant of only fourteen milliseconds whenever D.C. is used to energize the winding 28 and can have an overall time constant of as little as ten milliseconds whenever A.C. is used to energize that winding.

In assembling the electromagnetic device of FIGS. 1 and 2, the laminations of the stator 22 are suitably punched and are then assembled together. Thereafter, the winding 28 is wound into the slots of that stator. The stator 22 and its winding 28 are then placed within a mold, and the "potting" compound will then be used to embed that winding.

The web 48 is secured to the hollow shaft 42, as by welding; and the slingers 54 are then secured to that hollow shaft. The clamps 50 at one side of that web are suitably secured to that web, as by brazing. Thereafter, the laminations of the annulus 52 are set in engagement with each other and with the clamps 50 at the one side of the web 48; and thereupon the clamps 50 at the other side of that web are secured to that web, as by brazing.

The cup-like portion 30 of the housing is then pressed onto the stator 22, and the anti-friction bearing 38 is pressed onto the left-hand end of the hollow shaft 42. Thereafter, that shaft and the web 48 and the annulus 52 will be telescoped into the open right-hand end of the housing until the outer race of the bearing 38 engages and is held by the annular socket 34 of the cup-like portion 30 of the housing. The inner race of the anti-friction bearing 40 is then telescoped over the right-hand end of the hollow shaft 42; and then the cup-like portion 32 of the housing can be pressed onto the stator 22 while the socket 36 is pressed onto the outer race of the anti-friction bearing 40.

Referring to FIGS. 3 and 4, the numeral 60 denotes a stator which is formed from a large number of laminations of magnetic material such as steel. Those laminations are elongated and narrow, and they are set in face-to-face relation to define an annulus. That annulus abuts the inner face of an annular housing 62 of non-magnetic material. An end plate 64 of annular configuration is telescoped within one end of the annulus defined by the stator 60, and an end plate 66 of annular configuration is telescoped within the other end of that stator. The end plate 66 has a sheave-like projection 67 thereon. Those end plates are made from non-magnetic material.

The end plate 64 has an annular socket 68 therein, and the end plate 66 has an annular socket 70 therein. Those sockets are in register with each other; and they accommodate anti-friction bearings 71 and 72, respectively. A hollow shaft 76 has portions of reduced thickness which are accommodated by the inner races of the anti-friction bearings 71 and 72. That hollow shaft has a keyway 78, as shown particularly by FIG. 4; and that keyway can receive a key which will prevent relative rotation between that hollow shaft and a shaft, not shown, which can be telescoped within that hollow shaft. A set screw 79 is mounted within a threaded opening 81 in the shaft 76, and that set screw can help prevent relative rotation between that hollow shaft and the shaft, not shown.

The hollow shaft 76 has a portion 80 of increased thickness; and that portion provides two shoulders which can receive the inner races of the anti-friction bearings 71 and 72. The hollow shaft 76 has a passageway 82 which extends through it, and it has a sleeve 84 which is fixedly secured to it, as by a set screw 85. The sleeve 84 has radially-extending passages therein which communicate with the passage 82 in the hollow shaft 76. Slip rings 86 are disposed in circumferentially-extending grooves in the face of the sleeve 84, and those circumferentially-extending grooves communicate with the radially-extending passages in that sleeve.

The numeral 88 denotes a web that is secured to the portion 80 of increased thickness of the hollow shaft 76, as by a weld. That web is made thin to reduce the mass thereof, and it is provided with openings 89 to further reduce the mass thereof. That web supports an annulus 90 which is made up of a large number of laminations of magnetic material such as steel. Those laminations are mounted in intimate face-to-face relationship, as indicated by FIG. 4. The periphery of the web 88 abuts the inner faces of each of the laminations of the annulus 90, and that periphery will be suitably secured to those laminations as by brazing.

Each of the laminations of the annulus 90 has a recess in the outer edge thereof, and those recesses coact to define an annular recess 92 in the periphery of the annulus 90. A winding 94 is disposed within that recess, and conductors 100 are connected to the terminals of that winding. Those conductors extend radially inwardly in abutting relation with one face of the web 88, extend inwardly through the passage 82, extend axially through that passage, and finally extend radially outwardly through the passages in the sleeve 84 to engage the slip rings 86. Suitable brushes, not shown, will be mounted adjacent the slip rings 86 and can be used to supply current to those slip rings.

Slingers 98 are secured to the portion 80 of increased thickness of the hollow shaft 76; and those slingers are interposed between the web 88 and the anti-friction bearings 71 and 72. Those slingers are intended to cause any magnetic particles 104, that tend to work their way into the anti-friction bearings 71 and 72, to be thrown radially outwardly toward the working gap between stator 60 and the annulus 90. The magnetic lines of force generated by the coil 94 will then be able to attract those magnetic particles and to keep them from passing into the anti-friction bearings 71 and 72. To facilitate a clear showing of the relatively-rotatable parts in FIG. 4, the magnetic particles 104 are not shown in FIG. 4. Those magnetic particles are of standard and usual size, form and composition; and enough of those magnetic particles are provided to more than fill the working gap between the stator 60 and the annulus 90.

A "potting" compound will be used to help fill the annular recess 92 and to embed the winding 94. That "potting" compound will keep magnetic particles 104 out of that winding, just as the "potting" compound 29 of FIGS. 1 and 2 keeps magnetic particles 56 out of the winding 28.

The electromagnetic device of FIGS. 3 and 4 is adapted for use as an electromagnetic clutch; and where that electromagnetic device is used as an electromagnetic clutch, a rotatable shaft, not shown, will be telescoped within the hollow shaft 76 and suitably locked in that hollow shaft by a key within the keyway 78 and by a set screw 79 within the threaded opening 81. The housing 62 will be suitably mounted so it can rotate; and a belt will be passed around the sheave-like projection 67 and around a sheave on a driven member. As long as the winding 94 remains de-energized the shaft, not shown, within the hollow shaft 76 will be able to rotate freely relative to the housing. However, as current is caused to flow through the winding 94, that winding will develop magnetic flux lines which will pass from the annulus 90 across the working gap into the stator 60, will pass through that stator until they are adjacent the opposite side of the coil 94, and will then re-enter the annulus 90. As those flux lines move through the working gap between the stator 60 and the annulus 90, they will pass through the magnetic particles in that working gap and will cause those particles to apply substantial forces to both the stator 60 and the annulus 90. Preferably, the winding 94 will be capable of generating sufficient magnetic flux lines to be able to force the hollow shaft 76 and the housing 62 to rotate as a unit.

In assembling the electromagnetic device of FIGS. 3 and 4, the various laminations of the annulus 90 will be punched and will then be assembled in face-to-face relation. The web 88 and the slingers 98 will be suitably secured to the hollow shaft 76; and then that web will be brazed into engagement with the inner periphery of the annulus 90. The inner races of the anti-friction bearings 71 and 72 will then be passed onto the ends of the hollow shaft 76. The winding 94 will then be wound into the annular recess 92 within the annulus 90; and the conductors 100 will be passed through the openings in a couple of the laminations of the annulus and then passed inwardly in abutting relation with a face of the web 88 and into the passage 82 in the hollow shaft 76. The ends of those conductors will then be threaded through the passages in the sleeve 84; and thereafter that sleeve will be telescoped onto the left-hand end of the hollow shaft 76. The ends of those conductors can then be suitably secured, as by solder, to the slip rings 86. The set screw 85 will then be used to fixedly lock the sleeve 84 against rotation relative to the hollow shaft 76.

The various laminations of the stator 60 will be suitably assembled together to form an annulus, and then disposed within the housing 62. Thereafter, the end plate 66 can be pressed into position with its periphery engaging the inner surface of the stator 60. The outer race of the anti-friction bearing 72 can then be telescoped inwardly through the open left-hand end of the housing 62 until it telescopes within the socket 70 of that end plate. Thereafter, the end plate 64 can have the socket 68 thereof telescoped over the sleeve 84 and telescoped into engagement with the outer race of the anti-friction bearing 71. At such time, the periphery of that end plate will be telescoped within the annulus 90.

The slingers 54 and 98 can be made in different forms and shapes. Those slingers are not, per se, part of the present invention and are shown for purposes of illustration only.

It will be noted that the annuli of magnetic material in the electromagnetic devices of FIGS. 1 and 2 and of FIGS. 3 and 4 are mounted on thin webs. Furthermore, it will be noted that the masses of those annuli are small. As a result, the moments of inertia of the rotating parts of the electromagnetic devices of the present invention are small.

The electromagnetic devices provided by the present invention can be energized with alternating current or with direct current. Where the electromagnetic devices of FIGS. 1 and 2 and of FIGS. 3 and 4 are energized with alternating current, the time constants thereof will be shorter than they will be when those electromagnetic devices are energized with direct current.

It will be noted that the only gap, for the magnetic flux lines in the electromagnetic device of FIGS. 3 and 4, in the direction of flow of those flux lines is the working gap between the stator 60 and the annulus 90. As a result, the electromagnetic device of FIGS. 3 and 4 is completely free of the additional gaps commonly found in electromagnetic devices which use magnetic particles. The elimination of additional gaps from the stator 60 and annulus 90 reduces the amount of power needed to operate that electromagnetic device. The laminating of the stator 60 and of the annulus 90 and the use of a thin web to support that annulus have made it possible to provide a time constant for the electromagnetic device of FIGS. 3 and 4 which is much shorter than the time constant of a conventional electromagnetic device using magnetic particles.

In FIGS. 1 and 2 a thin web 48 is disposed adjacent the center of the rotor; and in FIGS. 3 and 4 a thin web 88 is disposed adjacent the center of the rotor. However, if desired, the web 48 could be replaced by two even thinner webs at the opposite ends of the thick portion 46 of the hollow shaft 42. Similarly if desired, the web 88 could be replaced by two even thinner webs at the opposite ends of the thick portion 80 of the hollow shaft 76.

In the electromagnetic devices of FIGS. 1 and 2 and of FIGS. 3 and 4, the working gaps are cylindrical in form and extend axially of the rotors. If desired, the electromagnetic device of FIGS. 3 and 4 could be modified so the working gap thereof was circular in form and extended radially of the rotor. For example, the laminations of the stator 60 could be rotated ninety degrees so the long axes thereof were radially-directed rather than axially-directed. Similarly, the laminations of the annulus 90 could be rotated ninety degrees so the long axes thereof were radially-directed rather than axially directed. The laminations of the stator 60 would then form a wide, annular face that could confront a wide, annular, winding-containing face of the annulus 60. Those faces would be mounted immediately adjacent each other and would define the working gap for the electromagnetic device. The winding would generate magnetic lines of flux; and those lines of flux would pass through that working gap and through the magnetic particles therein to cause those magnetic particles to apply forces to that stator and to that annulus.

In the foregoing description, the inner member of each electromagnetic device has been referred to as a rotor, and the outer member of each electromagnetic device has been referred to as a stator. However, while the outer member 60 in FIGS. 3 and 4 has been described as a stator, that member is intended to, and does, rotate. Hence it will be understood that the word "stator" refers to a member which is mounted adjacent a rotor and which may or may not rotate.

In reducing the time constants of electromagnetic devices, such as electromagnetic clutches or electromagnetic brakes which use magnetic particles, the present invention has made it possible to use alternating current to operate those electromagnetic devices. Prior electromagnetic devices, such as electromagnetic clutches or electromagnetic brakes which used magnetic particles had such long time constants that they could not respond to the alternations of fifty cycle and sixty cycle alternating current. As a result, those prior electromagnetic devices, such as electromagnetic clutches or electromagnetic brakes which used magnetic particles, were limited in application. The electromagnetic devices of the present invention are, however, not so limited—being capable of being operated by alternating current as well as by direct current.

In the electromagnetic device of FIGS. 1 and 2, the "potting" compound 29 defines a wear-resisting annulus that will keep the magnetic particles 56 out of the winding 28. If desired, however, the end turns of that winding could be covered and encased by tape to keep those magnetic particles out of that winding. Also, if desired, tubes or sleeves of non-magnetic metal, of formica, of plastic, or of other material which had outer diameters that were slightly smaller than the inner diameters of the end turns of the winding 28, could be telescoped within those end turns and used to span the spaces between the inner faces of the end plates 30 and 32 and the end faces of the stator 22. Those tubes or sleeves would then keep the magnetic particles out of that winding.

Whereas the drawing and accompanying description have shown and described two preferred embodiments of the present invention it should be apparent to those skilled in the art that various changes may be made in the form of the invention without affecting the scope thereof.

What I claim is:

1. An electromagnetic device that comprises:
(a) a rotor,
(b) a stator,
(c) said rotor and said stator having confronting portions that are spaced apart to define a working gap,
(d) a housing that encloses said working gap and said confronting portions of said rotor and stator and that holds magnetic particles available to said working gap,
(e) bearings that permit relative rotation between said rotor and said stator,
(f) a web that supports said confronting portion of said rotor,
(g) an annular recess in said confronting portion of said rotor,
(h) a winding that is disposed within said annular recess and that responds to the flow of current therethrough to cause magnetic lines of flux to pass through said working gap between said rotor and said stator, and
(i) a shaft that supports said web,
(j) said magnetic particles responding to said magnetic lines of flux to move into said working gap and apply forces to both said rotor and said stator,
(k) said rotor having the confronting portion thereof formed from a plurality of laminations of magnetic material,
(l) said laminations being parallel to the axis of said shaft,
(m) said stator having the confronting portion thereof formed from a plurality of laminations of magnetic material,
(n) said laminations of said stator being parallel to said axis of said shaft,
(o) said confronting portion of said stator being completely free of air gaps in the direction of flow of said magnetic lines of flux,
(p) said confronting portion of said rotor being completely free of air gaps in the direction of flow of said magnetic lines of flux,
(q) whereby said winding can apply flux lines of substantially undiminished strength to said working gap,
(r) said web being narrow and being intermediate the ends of said confronting portion of said rotor, whereby said confronting portion of said rotor is cantilever-like relative to said web.

2. An electromagnetic device that comprises:
(a) a rotor,
(b) a stator,
(c) said rotor and said stator having confronting portions that are spaced apart to define a working gap,
(d) a housing that encloses said working gap and said confronting portions of said rotor and stator and that holds magnetic particles available to said working gap, and
(e) a winding that responds to the flow of current therethrough to cause magnetic lines of flux to pass through said working gap between said rotor and said stator,
(f) said magnetic particles responding to said magnetic lines of flux to move into said working gap and apply forces to both said rotor and said stator,
(g) said rotor having the confronting portion thereof formed from a plurality of laminations of magnetic material,
(h) said stator having the confronting portion thereof formed from a plurality of laminations of magnetic material,
(i) said confronting portion of said stator being substantially free of air gaps in the direction of flow of said magnetic lines of flux,
(j) said confronting portion of said rotor being substantially free of air gaps in the direction of flow of said magnetic lines of flux,
(k) whereby said winding can apply flux lines of substantially undiminished strength to said working gap,
(l) said laminations of said stator extending axially of said stator,
(m) said laminations of said rotor extending axially of said rotor.

3. An electromagnetic device that comprises:
(a) a rotor,
(b) a stator,
(c) said rotor and said stator having confronting portions that are spaced apart to define a working gap,
(d) a housing that encloses said working gap and said confronting portions of said rotor and stator and that holds magnetic particles available to said working gap, and
(e) a winding that responds to the flow of current therethrough to cause magnetic lines of flux to pass through said working gap between said rotor and said stator,
(f) said magnetic particles responding to said magnetic lines of flux to move into said working gap and apply forces to both said rotor and said stator,
(g) said rotor having the confronting portion thereof formed from a plurality of laminations of magnetic material,
(h) said stator having the confronting portion thereof formed from a plurality of laminations of magnetic material,
(i) said laminations of said stator extending axially of said stator,
(j) said laminations of said rotor extending axially of said rotor.

4. An electromagnetic device that comprises:
(a) a rotor,
(b) a stator,
(c) said rotor and said stator having confronting portions that are spaced apart to define a working gap,
(d) a housing that encloses said working gap and said confronting portions of said rotor and stator and that holds magnetic particles available to said working gap, and
(e) a winding that responds to the flow of current therethrough to cause magnetic lines of flux to pass through said working gap between said rotor and said stator,
(f) said magnetic particles responding to said magnetic lines of flux to move into said working gap and apply forces to both said rotor and said stator,
(g) an annular recess in said rotor,
(h) said winding being disposed within said annular recess,
(i) said confronting portions of said rotor and stator being laminated to enable said electromagnetic device to have a short time constant,
(j) the laminations of said rotor and stator being directed transversely of said annular recess in said rotor.

5. An electromagnetic coupling device that comprises:
(a) a rotor,
(b) a stator,
(c) said rotor and said stator having confronting portions that are spaced apart to define a working gap,
(d) said rotor having the confronting portion thereof formed from a plurality of laminations of magnetic material,
(e) said stator having the confronting portion thereof formed from a plurality of laminations of magnetic material,
(f) one of said confronting portions having a multiplicity of slots therein distributed substantially uniformly along the length of said confronting portion,
(g) a housing that encloses said working gap and said confronting portions of said rotor and stator and that holds magnetic particles available to said working gap, and
(h) a winding that is wound within said multiplicity of slots in said one confronting portion and that has the end turns thereof projecting outwardly beyond the ends of said slots,
(i) said winding responding to the flow of current therethrough to develop a multiplicity of poles that cause magnetic lines of flux to pass through said working gap between said rotor and said stator,
(j) said winding having the odd-numbered poles thereof of one polarity and having the even-numbered poles thereof of opposite polarity,
(k) said multiplicity of poles and the alternating of said poles forcing substantially all of the lines of magnetic flux generated at one pole to pass to and through the adjacent, alternated poles,
(l) said magnetic particles responding to said magnetic lines of flux to move into said working gap and apply forces to both said rotor and said stator,
(m) said multiplicity of poles and the alternating of said poles forcing substantially all of said magnetic lines of flux from said winding to flow through short, generally circular paths in said confronting portion of said rotor and to remain close to said confronting portion of said rotor,
(n) said multiplicity of poles and the alternating of said poles forcing substantially all of said magnetic lines of flux from said winding to flow through short, generally circular paths in said confronting portion of said stator and limiting the distance which substantially every magnetic line of flux from said winding flows along the circumference of said stator to a value substantially less than one-half the length of said circumference of said stator,
(o) said winding being the sole source of magnetic flux lines for said electromagnetic coupling device and being energized by a source of current that is wholly external of said electromagnetic coupling device and that has a substantially constant voltage, whereby said winding can immediately generate the magnetic lines of flux for said multiplicity of poles and whereby the value of said magnetic lines of flux is substantially independent of the speed of rotation of said rotor,
(p) said laminations in said confronting portions of said rotor and stator coacting with the short circular paths for said magnetic lines of flux, caused by said multiplicity of alternated poles, to make the time constant for said electromagnetic coupling device a small fraction of the time constant of an electromagnetic coupling device of camparable torque rating which has a non-laminated rotor and stator and which forces the magnetic lines of flux thereof to flow through elongated paths in said rotor and stator.

References Cited by the Examiner

UNITED STATES PATENTS

| | | | |
|---|---|---|---|
| 2,575,360 | 11/1951 | Rahinow | 192—21.5 |
| 2,649,935 | 8/1953 | Tack | 192—21.5 |
| 2,663,809 | 12/1953 | Winslow | 192—21.5 |
| 2,794,525 | 6/1957 | Winther | 192—21.5 |
| 2,894,407 | 7/1959 | Brill | 192—21.5 |
| 2,925,896 | 2/1960 | Jarschke | 192—21.5 |
| 2,927,472 | 3/1960 | Grant | 192—21.5 |

FOREIGN PATENTS 1,142,319 3/1957 France.

DAVID J. WILLIAMOWSKY, *Primary Examiner.*